July 12, 1960 R. C. CASANOV 2,944,467
FAST ACTING TAILSTOCK
Filed June 23, 1958 2 Sheets-Sheet 1

INVENTOR
RAYMOND C. CASANOV

BY R.C. Terry
ATTORNEY

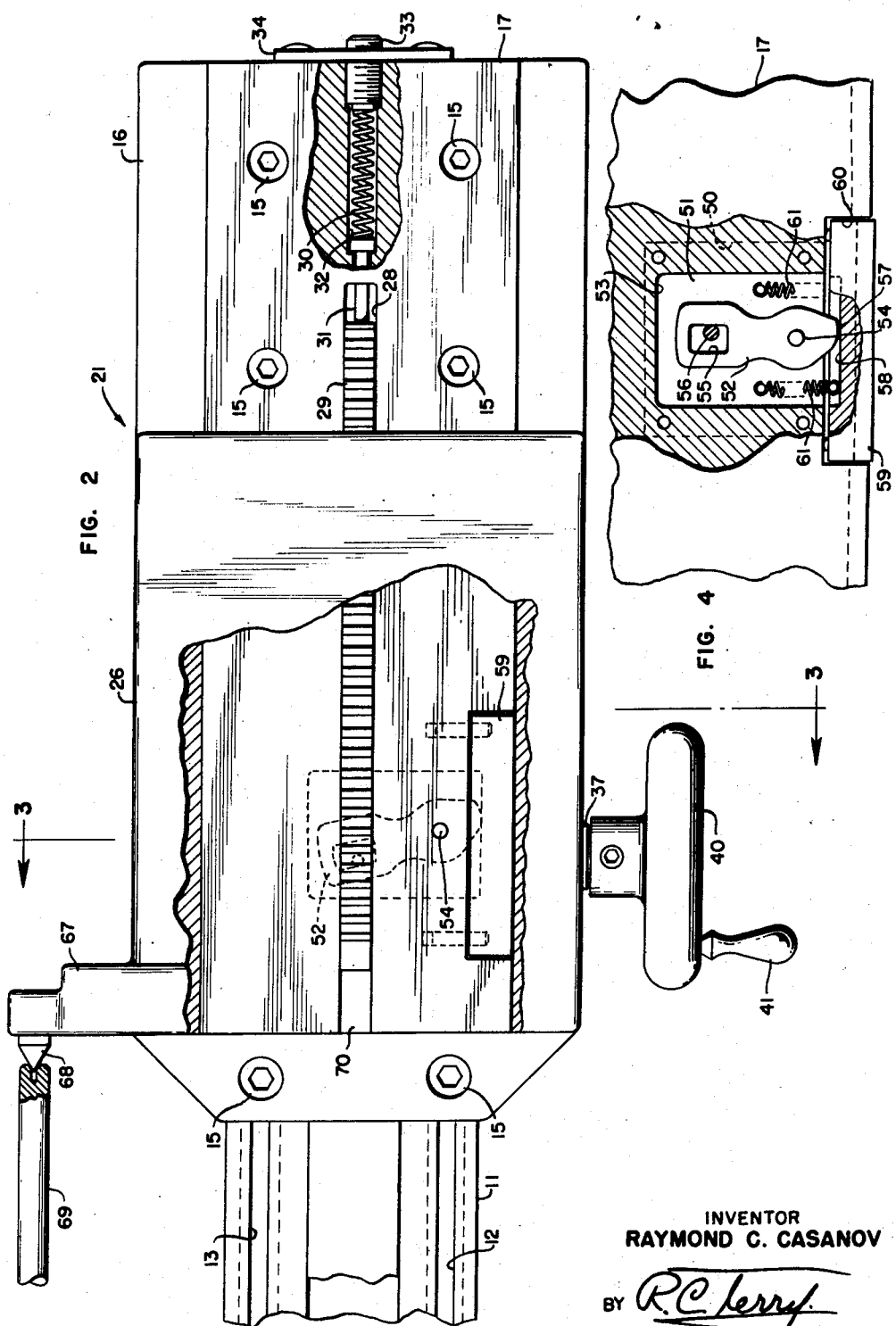

United States Patent Office 2,944,467
Patented July 12, 1960

2,944,467
FAST ACTING TAILSTOCK

Raymond C. Casanov, Chicago, Ill., assignor to Teletype Corporation, Chicago, Ill., a corporation of Delaware Filed June 23, 1958, Ser. No. 743,838

9 Claims. (Cl. 90—23)

This invention relates to tailstocks for lathes or other machine tools and more particularly to an improved mechanism for adjusting and locking the dead center of the tailstock against a workpiece.

In the past, numerous mechanisms have been proposed for insuring the proper pressure of a dead center on a workpiece to be machined or on an arbor carrying workpieces. Those which obtained the desired results have required several manual operations to mount the workpiece or arbor properly in the machine with the dead center engaging it with the desired pressure, and to hold that pressure throughout the working of the part or parts.

It is an object of the present invention to provide a simple tailstock structure for engaging the dead center of a machine tool with a workpiece or arbor under a predetermined pressure.

A further object of the invention is to provide a tailstock structure which is rendered effective to move and hold its dead center against the workpiece with a predetermined constant pressure as a result of a single, continuous, manual movement of a part of the mechanism.

More specifically stated, it is an object of the present invention to provide a tailstock structure wherein, upon the rotation of a handwheel, the dead center of the tailstock will engage a workpiece to be machined or an arbor carrying parts with a predetermined pressure and wherein continued rotation of the handwheel will lock the dead center against movement, and wherein reverse movement of the handwheel will unlock the dead center and return it to an inoperative position out of engagement with the workpiece or arbor.

In accordance with one embodiment of the invention, a tailstock for a lathe or a milling machine is provided wherein the dead center is mounted on a slide having a gear rotatably mounted on it for manual operation by means of a handwheel. The gear meshes with a rack resiliently mounted on the bed of the machine and when the gear is rotated in one direction, the tailstock will be moved to carry its dead center into engagement with the work. After the dead center engages the work, the continued rotation of the handwheel in the aforementioned direction will cause the rack to move away from the work, thereby compressing a spring which resiliently holds it in normal position, to press the dead center against the workpiece under a predetermined pressure. As the rack moves away from the workpiece, it will actuate a cam which in turn forces a clamp carried by the bed of the machine into clamping engagement with the slide, thereby to lock the dead center in its proper position where it will engage the workpiece with a desired pressure. Upon rotation of the handwheel in the opposite direction, the cam will be moved in a direction opposite to that in which it moved previously, and will release the clamp and will thereafter withdraw the dead center from the workpiece.

A complete understanding of the invention may be had from the following detailed description when considered in connection with the accompanying drawings wherein;

Fig. 2 is a plan view of the mechanism shown in Fig. 1, parts being broken away to show more clearly other parts;

Fig. 4 is a fragmentary plan view showing details of construction of the cam which locks the clamp against the bed of the machine.

Figures 1, 3:
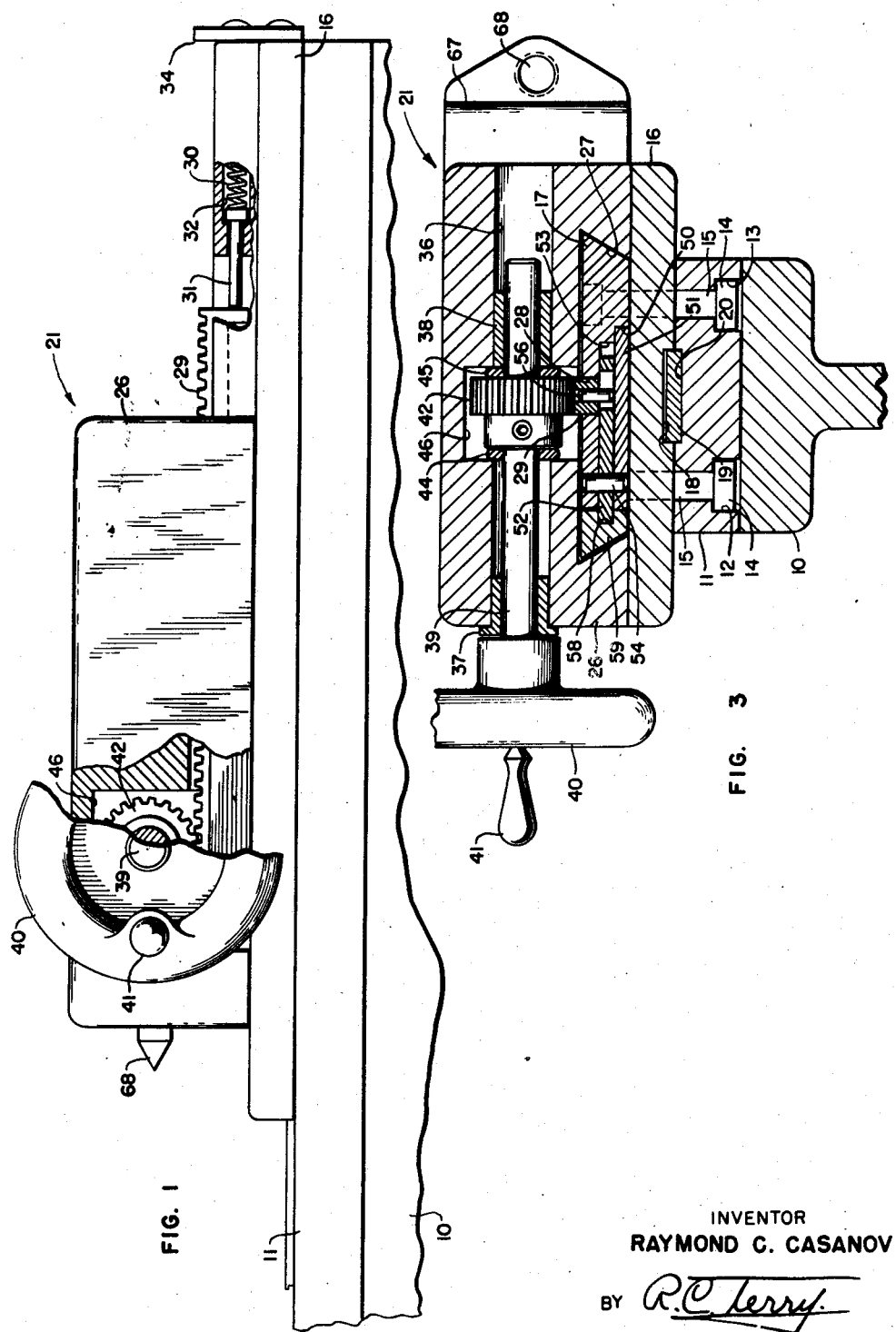
Fig. 1 is a front elevational view of the tailstock and of a portion of a milling machine equipped with the tailstock of the present invention.
Fig. 3 is a transverse sectional view taken substantially along the lines 3—3 in the direction of the arrows on Fig. 2.

Referring now to the drawings wherein like reference characters designate the same parts throughout the several views, it will be seen that the mechanism is mounted on a support 10 which may be the bed of a lathe, milling machine or other machine tool. The bed 10 (Figs. 2 and 3) has fixed to it, in any suitable manner, a base 11 which is provided with a pair of ways 12 and 13 for receiving internally threaded slide members or T-nuts 14 into which socket head screws 15 may be threaded. The screws 15 extend through a support plate 16 and serve to clamp the support plate 16 and a stationary dovetail 17 to the base 11. Thus the support plate 16 may be secured to the support or bed 10 in any of a plurality of adjusted positions longitudinally of the bed 10. The support plate 16 has a keyway 18 formed in it for receiving a key 19 which also extends into a keyway 20 in the base 11, thus properly to align the tailstock, designated generally by the numeral 21, on the bed 10 of the lathe or milling machine.

The tailstock 21 comprises a slide 26 which is provided with a dovetail groove 27 (Fig. 3) into which the stationary dovetail 17 extends. The dovetail 17 has a slot 28 formed in it in which there is slidably mounted a rack 29. The rack 29 is normally urged to move to the left (Figs. 1 and 2) by a compression spring 30 that bears against the head of a pin 31 interposed between the spring 30 and the rack 29. The pin 31 is slidable in a shouldered aperture 32 and is normally held in the position shown in Fig. 2 where its head rests against one of the shoulders of the aperture 32. The aperture 32 is enlarged at its right end (Fig. 2) to receive an adjusting screw 33 threaded into the stationary dovetail 17 and extends through a suitable aperture in a stop plate 34 for the tailstock 26, which plate is suitably attached to the stationary dovetail 17. It will thus be seen that the rack 29 normally remains in the position shown in Fig. 2, but if it is moved to the right in the slot 28, it will compress the spring 32 and the pressure which the spring will exert on the rack may be adjusted by manipulating the adjusting screw 33.

Adjacent to its left end, as viewed in Figs. 1 and 2, the slide 26 has a bore 36 formed in it for receiving a pair of bearings 37 and 38 (Fig. 3) which rotatably support a shaft 39 on which there is fixed a handwheel 40 provided with a suitable handle 41. Intermediate its end, the shaft 39 has fixed to it, a gear 42 that is held in alignment with the rack 29 by a pair of thrust bearings 44 and 45 which in turn engage the sides of a cutout 46 formed in the slide 26.

The underside of the stationary dovetail 17 has a rectangular recess 50 (Figs. 3 and 4) formed in it for receiving a plate 51 which serves to support a cam 52 for movement within a cutout 53 also formed in the dovetail 17 and forming a deeper portion of the rectangular recess 50. The cam 52 is mounted for oscillation about a pivot stud 54 which extends into the stationary dovetail 17 and into the plate 51. The cam 52 has a substantially rectangular aperture 55 in it, into which there extends an actuator pin 56 fixed to the rack 29. Thus when the rack 29 is moved with respect to the stationary dovetail 17, the actuator pin 56 will be brought into engagement with one side or the other of the substantially rectangular aperture 55 and will rock the cam 52 about the pivot stud 54. A camming surface 57 of the cam 52 (Fig. 4) engages the base of a slot 58 formed in a dovetail shoe 59 that is seated in a recess 60 formed in the stationary dovetail 17 and is normally urged away from the surface of the dovetail groove 27 by a pair of contractile springs 61 fixed to the dovetail shoe 59 and to the stationary dovetail 17.

The slide 26 (Fig. 2) has an arm 67 extending from it on which there is mounted a dead center 68 for engagement with a workpiece 69 to be processed in the lathe or milling machine when the slide 26 is advanced to the left (Figs. 1 and 2) by means of the handwheel 40. The slot 28 formed in the stationary dovetail 17 has a stop member 70 set into its left end so that the rack 29 is prevented from moving to the left with respect to the dovetail 17 beyond the point where it is shown in Fig. 2.

In the operation of the apparatus, a workpiece 69 or an arbor supporting parts to be worked which has been attached to the live center of the lathe or milling machine (not shown) may have its right end properly guided without the danger of burning the end of the piece by advancing the dead center 68 into engagement with it and holding it in engagement with it under the proper pressure. In order to engage the dead center 68 with the workpiece 69 or with an arbor supporting pieces to be machined, the handle 41 may be manipulated to turn the handwheel 40 in a counterclockwise direction to force the dead center 68 into engagement with the workpiece 69 under a fixed pressure and to lock the slide 26 in the position shown in Fig. 2. As illustrated in Fig. 2, the slide 26 is in such a position that the dead center 68 has engaged with the workpiece 69, but the spring 30 has not yet been compressed. In order to exert the proper pressure of the dead center 68 on workpiece 69, the handwheel 40 must be rotated in a counterclockwise direction (Fig. 1) to advance the slide 26 to the left (Figs. 1 and 3) whereupon, after a predetermined amount of pressure has been applied between the workpiece 69 and dead center 68, the spring 30 will start to compress due to the fact that the rack 29 will be moved to the right (Figs. 1 and 2) against the action of the spring 30. As the rack 29 moves to the right (Fig. 2), in its slot 28, the actuator pin 56, in moving with the rack 29, will move from the position shown in Fig. 2 to the position shown in Fig. 4 to engage with right hand side (Fig. 4) of the substantially rectangular aperture 55 in the cam 52. Continued rotation imparted in a counterclockwise direction to the handwheel 40 will thus force the cam 52 to the position shown in Fig. 4, and in so doing, the camming surface 57 on the cam 52 will force the dovetail shoe 59 outwardly and into binding engagement with the sloping side of the dovetail groove 27 to lock the slide 26 with respect to the stationary dovetail 17. The amount of pressure exerted by the dead center 68 on the workpiece 69 may be adjusted by manipulating the adjusting screw 33.

After a workpiece 69 has been machined in the lathe or milling machine, it may be released by the dead center by simply rotating the handwheel 40 in a clockwise direction. As the handwheel 40 is rotated in a clockwise direction, rack 29 will move to the left until it abuts the stop member 70. In moving to this position as illustrated in Fig. 2, the rack 29 will carry the pin 56 to engagement with the left hand side of the substantially rectangular aperture 55 in the cam 52 to rock the cam to the position shown in Fig. 2, thus to permit the shoe 59 to move back under the action of the springs 61. Continued rotation of the handwheel 40 in a clockwise direction will cause the slide 26 to move to the right along the rack 29, thus to completely release the dead center from the workpiece.

What is claimed is:

1. A tailstock for a milling machine comprising a dead center for engagement with a workpiece, a slide for supporting said dead center, a gear rotatably mounted in said slide, means for imparting rotation to said gear, a bed for slidably supporting said slide, a rack in mesh with said gear and mounted for movement with respect to said bed, a cam actuating pin mounted on said rack, a cam member oscillatably mounted on said bed for actuation by said pin, and clamping means mounted for actuation by said cam to clamp said slide to said bed.

2. A tailstock for a milling machine comprising a dead center, a slide for supporting said dead center, a gear rotatably mounted in said slide, means for imparting rotation to said gear to move said dead center into engagement with a workpiece, a bed for slidably supporting said slide, a rack in mesh with said gear and mounted for movement with respect to said bed, a cam member oscillatably mounted on said bed, clamping means mounted for actuation by said cam to clamp said slide to said bed, and means on said rack for actuating said cam member when said rack moves with respect to said bed by said gear.

3. A tailstock for a milling machine comprising a dead center, a slide for supporting said dead center for engagement with a workpiece, a gear rotatably mounted in said slide and operable to engage the dead center with a workpiece, means for imparting rotation to said gear, a bed for slidably supporting said slide, a rack in mesh with said gear and mounted on said bed for movement relative to said bed and relative to said slide, resilient means tending to hold the rack in a predetermined position with respect to the bed, a cam actuating pin mounted on said rack, a cam member oscillatably mounted on said bed for actuation by said pin when said rack moves relative to said bed, and clamping means mounted for actuation by said cam to clamp said slide to said bed.

4. A tailstock for a milling machine or the like having a bed, comprising a slide movable with respect to said bed, a dead center mounted on said slide for engagement with a workpiece, a rack mounted for sliding movement with respect to said bed, resilient means tending to hold said rack against movement, a gear rotatable with respect to said slide and in mesh with said rack for effecting relative movement between the rack and slide, means for imparting rotation to said gear to move the slide along the rack and to carry the dead center into engagement with the work, and means operable upon continued rotation of the said gear after the dead center engages the workpiece and the consequent movement of the rack by the gear to lock the slide against further movement.

5. A tailstock for a milling machine or the like having a bed comprising a slide movable with respect to said bed, a dead center mounted on said slide for engagement with a workpiece, a rack mounted for sliding movement with respect to said bed, resilient means tending to hold said rack against movement, a gear rotatable with respect to said slide and in mesh with said rack for effecting relative movement between the rack and slide, means for imparting rotation to said gear to move the slide along the rack and carry the dead center into engagement with the work, and means operable upon continued rotation of the said gear after the dead center engages the workpiece and the consequent movement of the rack by the gear against the force exerted by said resilient means to lock the slide against further movement.

6. A tailstock for a milling machine or the like having a bed, comprising a slide movable with respect to said bed, a dead center mounted on said slide for engagement with a workpiece, a rack mounted for sliding movement with respect to said bed, resilient means tending to hold said rack against movement, a gear rotatable with respect to said slide and in mesh with said rack for effecting relative movement between the rack and slide, means for imparting rotation to said gear to move the slide along the rack and carry the dead center into engagement with the work, locking means for locking said slide in position to hold the dead center in engagement with the workpiece, means operable upon continued rotation of the said gear after the dead center engages the workpiece and the consequent movement of the rack by the gear to compress said resilient means, and means actuated by the rack when it is moved by the gear for actuating said locking means.

7. A tailstock for a milling machine or the like having a bed, comprising a slide movable along said bed, a workpiece engaging dead center on said slide, a gear mounted for rotation in said slide, means for imparting rotation to said gear, a rack in mesh with said gear and slidable with respect to the bed and the slide, resilient means tending to hold said rack in a predetermined position relative to the bed and effective to hold the dead center against the workpiece under a predetermined pressure when the gear is rotated a predetermined amount in one direction, and means actuated by said rack when said gear is rotated in said one direction beyond said predetermined amount for locking said slide against movement.

8. A tailstock for a milling machine or the like having a bed, comprising a slide movable along said bed, a workpiece engaging dead center on said slide, a gear mounted for rotation in said slide, means for imparting rotation to said gear, a rack in mesh with said gear and slidable with respect to the bed and the slide, resilient means tending to hold said rack in a predetermined position relative to the bed and effective to hold the dead center against the workpiece under a predetermined pressure when the gear is rotated a predetermined amount in one direction, means actuated by said rack when said gear is rotated in said one direction beyond said predetermined amount for locking said slide against movement, and means rendered operative by said rack when the gear is rotated in an opposite direction for unlocking said slide for movement by said resilient means.

9. A tailstock for a milling machine or the like having a bed, comprising a slide movable along said bed, a workpiece engaging dead center on said slide, a gear mounted for rotation in said slide, a rack in mesh with said gear and slidable relative to the bed and the slide, a handwheel for imparting rotation to said gear to move the slide along the rack through said gear, a spring tending to hold said rack in a predetermined position relative to the bed so that rotation of the gear in one direction will move the slide along the rack until the dead center engages the workpiece and the continued rotation of the gear will compress the spring by moving the rack with respect to the bed, a cam member oscillatably mounted on said bed, a pin on said rack for actuating said cam, clamping means for actuation by said cam when the rack moves in one direction with respect to the bed to lock the slide to the bed, and means rendered operable by movement of the rack in the opposite direction with respect to the bed to unlock the slide from the bed.

References Cited in the file of this patent

UNITED STATES PATENTS

| | | |
|---|---|---|
| 2,368,877 | Purrin | Feb. 6, 1945 |
| 2,525,805 | Kirkpatrick | Oct. 17, 1950 |
| 2,576,498 | Bassoff | Nov. 27, 1951 |

FOREIGN PATENTS

| | | |
|---|---|---|
| 1,004,563 | France | Nov. 28, 1951 |